(12) United States Patent
Goh et al.

(10) Patent No.: US 9,447,831 B2
(45) Date of Patent: Sep. 20, 2016

(54) ACTUATOR FOR ELECTRICAL PARKING BRAKE SYSTEM

(71) Applicants: Hyundai Motor Company, Seoul (KR); Kia Motors Corporation, Seoul (KR); Dong Ah High Tech Co., Ltd., Gwangju-si, Gyeonggi-do (KR); Hyundai Mobis Co., Ltd., Seoul (KR)

(72) Inventors: Sang Bum Goh, Suwon-si (KR); Dong Ho Kook, Suwon-si (KR); In Wook Park, Seoul (KR)

(73) Assignees: Hyundai Motor Company, Seoul (KR); Kia Motors Corporation, Seoul (KR); Dong Ah High Tech Co., Ltd., Gwangju-si (KR); Hyundai Mobis Co., Ltd., Seoul (KR)

( * ) Notice: Subject to any disclaimer, the term of this patent is extended or adjusted under 35 U.S.C. 154(b) by 91 days.

(21) Appl. No.: 14/449,760

(22) Filed: Aug. 1, 2014

(65) Prior Publication Data
US 2015/0136542 A1    May 21, 2015

(30) Foreign Application Priority Data

Nov. 20, 2013    (KR) .................. 10-2013-0141094

(51) Int. Cl.
| | |
|---|---|
| *F16D 65/14* | (2006.01) |
| *F16D 65/18* | (2006.01) |
| *F16D 121/24* | (2012.01) |

(Continued)

(52) U.S. Cl.
CPC ........... *F16D 65/18* (2013.01); *F16D 2121/24* (2013.01); *F16D 2123/00* (2013.01); *F16D 2125/52* (2013.01)

(58) Field of Classification Search
CPC ........ F16H 1/16; F16H 57/039; F16H 55/22; H02K 7/081; F16D 65/14; F16D 2121/24; F16D 2125/40; F16D 2125/52; B60T 13/74; B60T 13/741; B60T 13/746
USPC ..... 188/162, 196 V, 79.63; 74/606 R, 665 R, 74/724, 89, 89.14, 425
See application file for complete search history.

(56) References Cited

U.S. PATENT DOCUMENTS

| | | | |
|---|---|---|---|
| 5,161,650 A | * | 11/1992 | Taig .................. B60T 13/12 188/71.9 |
| 5,570,606 A | * | 11/1996 | Irie .................. F16H 1/203 74/425 |

(Continued)

FOREIGN PATENT DOCUMENTS

| | | |
|---|---|---|
| JP | 2008-190556 A | 8/2008 |
| KR | 10-2010-0008512 A | 1/2010 |

(Continued)

*Primary Examiner* — Robert A Siconolfi
*Assistant Examiner* — San Aung
(74) *Attorney, Agent, or Firm* — Morgan, Lewis & Bockius LLP

(57) ABSTRACT

An actuator for an electrical parking brake system can decrease the number of components and reduce noise generated in an operation of the actuator. The actuator includes a case, a motor installed in the case to provide power, a driving gear provided to a rotary shaft of the motor, a pair of transmission members installed inside the case to reduce torque of the driving gear and transmit the reduced torque, and an output gear provided to an output shaft to additionally reduce the reduced torque transmitted through the transmission member and output the additionally reduced torque through the output shaft.

2 Claims, 3 Drawing Sheets

(51) Int. Cl.
*F16D 125/52* (2012.01)
*F16D 123/00* (2012.01)

(56) References Cited

U.S. PATENT DOCUMENTS

| | | | | |
|---|---|---|---|---|
| 6,484,608 | B1* | 11/2002 | Ziavras | B64G 1/66 |
| | | | | 74/490.09 |
| 7,144,126 | B2* | 12/2006 | Ro | B60R 1/072 |
| | | | | 248/476 |
| 7,992,691 | B2 | 8/2011 | Maron et al. | |
| 2003/0205437 | A1* | 11/2003 | Drennen | F16D 65/18 |
| | | | | 188/157 |
| 2006/0169553 | A1* | 8/2006 | Geyer | B60T 7/107 |
| | | | | 188/265 |
| 2009/0071279 | A1* | 3/2009 | Huck | E05F 15/697 |
| | | | | 74/425 |
| 2012/0031716 | A1* | 2/2012 | Flodin | F16D 51/18 |
| | | | | 188/79.63 |

FOREIGN PATENT DOCUMENTS

| | | |
|---|---|---|
| KR | 10-2011-0026115 A | 3/2011 |
| KR | 10-1094333 B1 | 12/2011 |
| KR | 10-2013-0020369 A | 2/2013 |
| KR | 10-2013-0061933 A | 6/2013 |
| KR | 10-2013-0082021 A | 7/2013 |
| WO | WO 2009/146707 A1 | 12/2009 |

* cited by examiner

ACTUATOR FOR ELECTRICAL PARKING BRAKE SYSTEM

CROSS-REFERENCE TO RELATED APPLICATION

The present application claims priority of Korean Patent Application Number 10-2013-0141094 filed on Nov. 20, 2013, the entire contents of which application are incorporated herein for all purposes by this reference.

BACKGROUND OF INVENTION

1. Field of Invention

The present invention relates to an actuator for an electrical parking brake system. More particularly, the present invention relates to an actuator for an electrical parking brake system, which can decrease the number of components and reduce noise generated in an operation of the actuator.

2. Description of Related Art

When a user parks a vehicle, the movement of the vehicle is generally restricted by manipulating a parking brake. If a cable is pulled by a parking lever in an ordinary parking brake, the force applied to the cable is distributed to a brake mechanism mounted to a wheel through an equalizer, and accordingly, the brake mechanism restricts the wheel, thereby preventing the movement of a vehicle.

However, the manipulation of the parking lever of the parking brake makes a user feel inconvenience. Accordingly, there has been developed an electrical parking brake (EPB) system which generates braking power for parking a vehicle, using power of a motor through button manipulation.

Recently, an EPB system for controlling the braking/releasing of a vehicle through simple button manipulation without lever manipulation has come into wide use. The EPB system eliminates user's inconvenience that user should manually manipulate a parking lever, thereby enhancing user's convenience.

The EPB system includes a cable puller type EPB system, a motor-on-caliper type (generally referred to as "caliper integrated" in the art) EPB system, a hydraulic EPB system, and the like. Among these EPB systems, the caliper integrated EPB system is widely used, which facilitates the mountability of the EPB system, using a method of integrating the EPB system with a caliper.

The EPB system generates braking power (target clamping force) by using together hydraulic braking through a brake pedal and motor power through an actuator as an electric power generation means. Thus, the EPB system can perform together hydraulic braking and electric power parking braking.

Particularly, in a case where the EPB system is integrated with a caliper, a gear device which converts a final output into a large load is applied while using a small-sized motor, so that the size of the caliper is not increased, thereby achieving a compact configuration.

The configuration of the EPB system will be described. The EPB system includes a button manipulated by a driver, a controller which outputs a control signal for generating braking power for parking a vehicle by receiving a button manipulation signal, an actuator which generates power according to the control signal output from the controller, and a caliper (EPB caliper) installed to surround a disc mounted to a wheel so that parking braking is implemented by restricting the disc and the wheel by means of power of the actuator.

FIGS. 1 and 2 are views showing the configuration of an electrical parking brake (EPB) system. In FIG. 1, reference numeral 10 denotes an actuator, and reference numeral 20 denotes a caliper. As shown in FIG. 2, the torque of the actuator is transmitted to a spindle 21, to be changed into a linear moving force which allows a nut member 22 to move forward. In a case where the linearly moving nut member 22 is contacted with an inner surface of a piston 23 by moving forward, the nut member 22 pushes the piston 23, and thus a disc 25 is compressed through a pad 24, thereby generating braking power.

However, the conventional EPB system has at least the following problems in its components including the actuator generating driving power (decelerated torque transmitted from a motor to the spindle), the spindle and the like.

Firstly, the degree of freedom is limited in setting a reduction ratio for enhancing rotary torque of the motor in terms of package layout and structure, and therefore, the load of the motor and the consumption of current are restrictive.

Secondly, when the power of a vehicle is off, the spindle takes charge of the function of self locking for preventing a brake from being pushed backward. Hence, the degree of freedom is limited in selecting specifications of the spindle, and a low-efficiency spindle is unavoidably used. Therefore, the current consumption of the actuator is excessive.

Thirdly, there is a problem of torque loss and excessive vibration, caused by the backlash of gear engagement. In addition, the number of gear components and unit cost are increased due to the use of a multi-gear configured with a spur gear, a helical gear and a planetary gear.

Fourthly, when the EPB system is operated, a frictional sound is generated considerably due to an excessive number of gear components. In addition, the number of components related to a gear box for fixing and assembling gears is excessive, and unit cost is increased.

Fifthly, since the number of components related to the gear and the gear box is excessive, it is highly likely that an assembling error and a failure may occur.

In order to solve such problems, Korean Patent Application No. 10-2013-0082021 (2013.7.18) discloses an actuator provided with a simpler configuration using a worm-gear-type gear having a high reduction ratio, rather than an actuator provided with a complicated configuration using a gear combination of a spur gear, a helical gear and a planetary gear.

In the actuator of the prior patent, a driving gear on a motor shaft, which is rotated in the driving of a motor, is formed in the shape of a worm gear, and a first gear portion of a transmission member, which is engaged with the driving gear, is formed in the shape of a spur gear (worm wheel).

In addition, a second gear portion of the transmission member, which transmits torque to an output gear, is formed in the shape of a worm gear, and the output gear engaged with the second gear portion of the transmission member is formed in the shape of a spur gear (worm wheel).

As described above, the driving gear on the motor shaft and the second gear portion of the shaft-shaped transmission member have the configuration of a double worm gear formed in the shape of a worm gear, and the primary and secondary reductions of speed are made through the driving gear and the second gear portion.

That is, the reduction of speed is made in a process of transmitting power between the driving gear and the first gear portion (the primary reduction of speed) and a process of transmitting power between the second gear portion and the output gear (the secondary reduction of speed).

However, in the actuator of the prior patent, the torque transmission efficiency is not good due to the excess of distortion torque of the gear shaft (transmission member), the deformation of a shaft system, the occurrence of backlash between gears, and the like in the application of a load.

Further, since stress generated in a specific part is excessive in the application of a load, the abrasion resistance of the actuator is lowered, and the lifespan of the actuator is reduced. In addition, the frictional sound (operation sound) of the gears is large due to the excess of stress and the instability of the shaft system.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides an actuator for an electrical parking brake system, which can decrease the number of components and reduce noise generated in an operation of the actuator. The present invention also provides an actuator which can overcome the excess of shaft distortion torque, the deformation of a shaft system and the occurrence of backlash, and improve torque transmission efficiency. The present invention also provides an actuator which can overcome the lowering of abrasion resistance due to the excess of stress generated in a specific part, the reduction of lifespan, and the occurrence of a frictional sound between gears.

In various aspects, the present invention provides an actuator for an electrical parking brake system, the actuator including a case, a motor installed in the case to provide power, a driving gear provided to a rotary shaft of the motor, a pair of transmission members installed inside the case to reduce torque of the driving gear and transmit the reduced torque, and an output gear provided to an output shaft to additionally reduce the reduced torque transmitted through the transmission member and output the additionally reduced torque through the output shaft.

In an aspect, each transmission member may be formed in a shaft shape to connect the driving gear and the output gear, and the pair of transmission members may be disposed at both left and right sides about the driving gear and the output gear. In another aspect, each transmission member may include a shaft-shaped main body rotatably installed inside the case; a first gear portion provided at one side of the main body and engaged with the driving gear; and a second gear portion provided at the other side of the main body and engaged with the output gear.

In still another aspect, the driving gear may be formed in the shape of a worm gear, and the first gear portion may be formed as a worm-wheel-shaped gear. In yet another aspect, the second gear portion may be formed in the shape of a worm gear, and the output gear may be formed as a worm-wheel-shaped gear.

In still yet another aspect, the pair of transmission members may have substantially the same shapes and sizes, and may be disposed substantially symmetrically to each other with respect to the driving gear and the output gear.

Other aspects and exemplary embodiments of the invention are discussed infra.

According to the actuator of the present invention, the actuator has a configuration including the driving gear, the transmission members and the output gear, so that it is possible to provide several advantages including reduction in the number of components, reduction in noise, reduction in the occurrence of an assembling error and failure, reduction in unit cost, implementation of high reduction ratio, enhancement of operational efficiency, reduction in current consumption, reduction in shaft system deformation and backlash and enhancement of torque transmission efficiency, as compared with the configuration of an actuator having a combination of a spur gear, a helical gear and a planetary gear.

Further, as the self locking function of the worm gear is implemented, it is possible to apply a high-efficiency spindle with non-self locking function. Further, the pair of transmission members disposed at both the left and right sides about the driving gear and the output gear are used, so that the distortion torque, the shaft system deformation and the backlash can be reduced as compared with the configuration of an actuator using a single transmission member, thereby enhancing the torque transmission efficiency. In addition, it is possible to overcome the lowering of abrasion resistance and the reduction in the lifespan of the actuator due to the concentration of stress and the excessive occurrence of stress, and the occurrence of a gear frictional sound.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
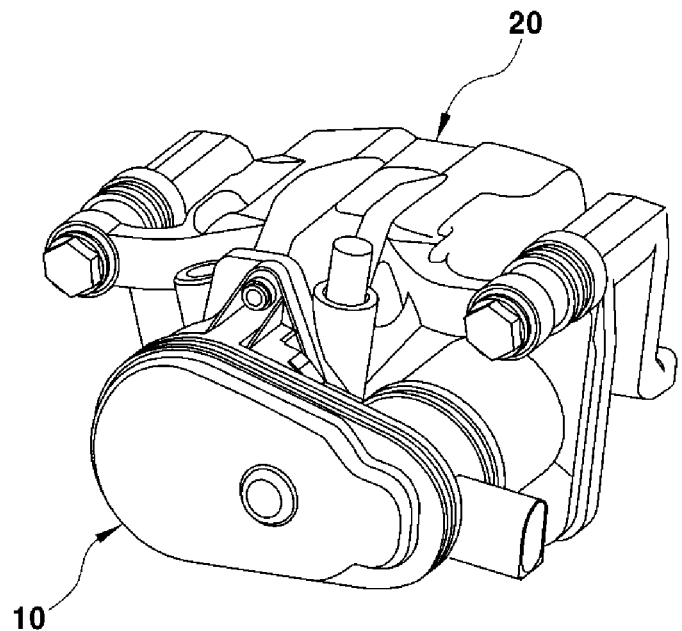
FIGS. 1 and 2 are views showing the configuration of an electrical parking brake system.
Figure 2:
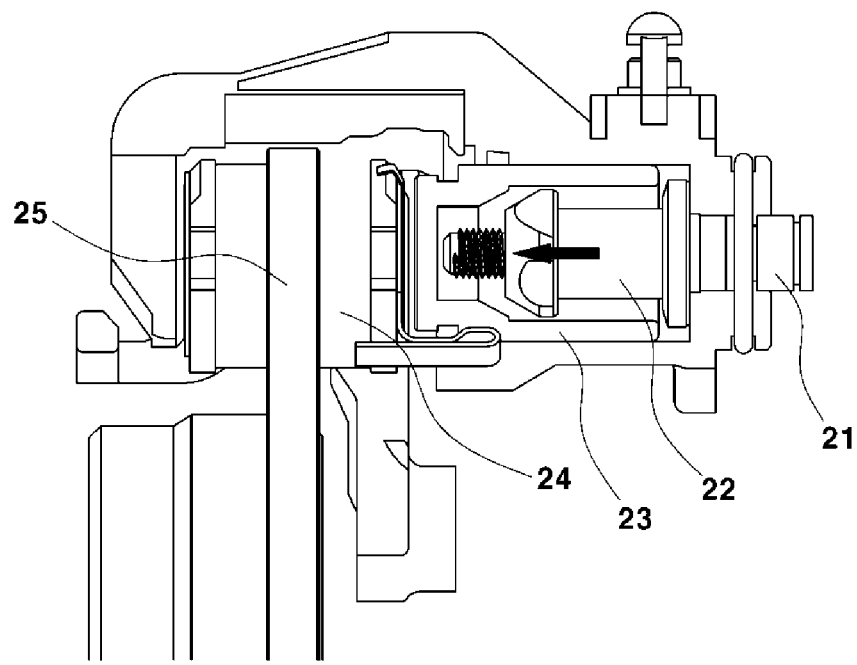

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides an actuator for an electrical parking brake system, which can decrease the number of components and reduce noise generated in an operation of the actuator.

In the electrical parking brake system, the actuator is a component which provides a driving force for generating braking power, i.e., a driving force for operating the parking brake system. The actuator has a configuration which reduces torque generated by a motor and then outputs the reduced torque through an output gear. The reduced torque output in the actuator is transmitted to a spindle of the parking brake system, and parking braking is made so that a wheel is restricted by the torque of the actuator.

Figure 3:
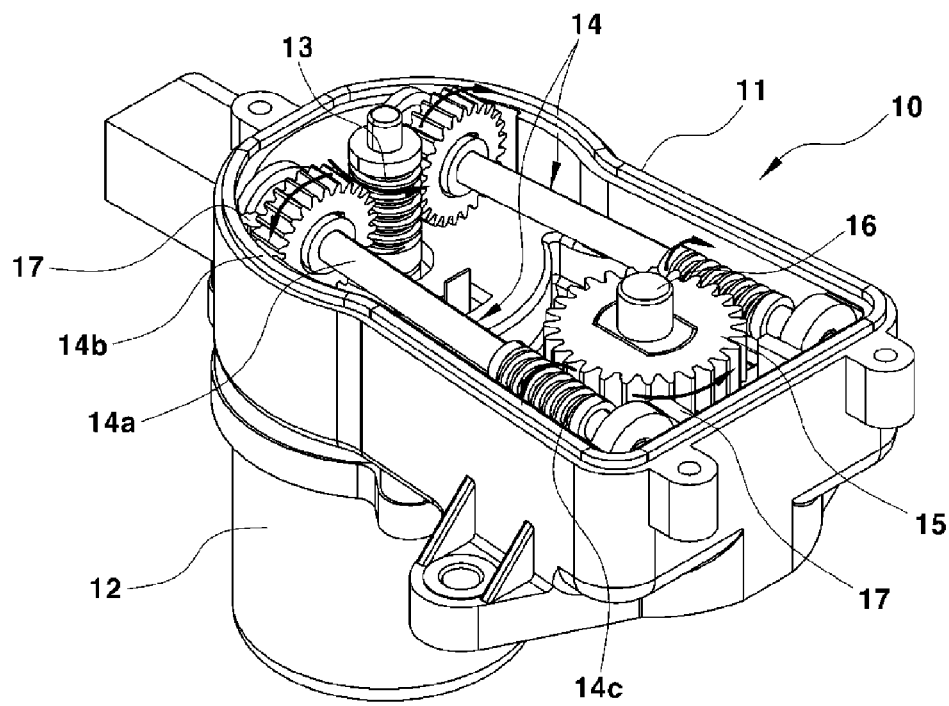
FIG. 3 is a perspective view showing an exemplary actuator according to the present invention.

FIG. 3 is a perspective view showing an actuator according to an embodiment of the present invention. In FIG. 3, a cover of a case 11 is removed for illustration purposes.

The configuration of the actuator 10 will be described. The actuator 10 includes the case 11, a motor 12 installed in the case 11 to provide power, a driving gear 13 provided to a rotary shaft of the motor 12, a pair of transmission members 14 formed in a shaft shape to reduce torque of the driving gear 13 and output the reduced torque, and an output gear 15 provided to an output shaft 16 to additionally reduce the torque transmitted through the transmission member 14 and output the additionally reduced torque through the output shaft 16.

When a parking brake system of a vehicle is operated, power is generated by applying electric power to the motor 12, and the power of the motor 12 is reduced through the driving gear 13, the pair of transmission members 14 and the output gear 15 and finally transmitted to the output shaft 16. Then, the reduced power of the motor 12 is output through the output shaft 16.

Through such a configuration including the driving gear 13, the transmission member 14 that is a shaft-shaped gear means, and the output gear as described above, it is possible to decrease the number of components and to reduce the unit cost of the actuator, as compared with the conventional actuator having a complicated configuration including the spur gear, the helical gear, the planetary gear and the like.

Particularly, vibration and noise can be reduced in the operation of the actuator. In addition, the number of components is decreased, and the configuration of the actuator is simplified, so that it is possible to improve the degree of design freedom, to reduce time and cost spent in manufacturing the actuator, to improve productivity, and the like.

In the actuator of the present invention, the driving gear 13 provided to the rotary shaft of the motor 12, the pair of transmission member 14, and the output gear 15 mounted to the output shaft 16 are disposed inside the case 11, and the output shaft 15, through which the final output of the torque is made, is provided to be connected to an outside of the case 11.

The pair of transmission members 14 as shaft-shaped gears are installed in the case so as to be disposed to be approximately or substantially horizontal at the left and right sides about the driving gear 13 and the output gear 15. In this case, the pair of left and right transmission members 14 is installed to connect between the driving gear 13 and the output gear 15.

In this case, the pair of the transmission members 14 may have similar or substantially the same shape. The pair of transmission members 14 may be installed inside the case 11 to be symmetric or substantially symmetric to each other about the driving gear 13 and the output gear 15.

Both end portions of each transmission member 14 are respectively supported by shaft support portions 17 disposed inside the case 11 in a state in which both the ends are rotatably coupled to the shaft support portions 17.

Each transmission member 14 includes a shaft-shaped main body 14a supported by the shaft support portion 17 to be rotatable, a first gear portion 14b provided at one side of the main body 14a and engaged with the driving gear 13, and a second gear portion 14c provided at the other side of the main body 14a and engaged with the output gear 15.

The two transmission members 14 configured as described above may have the same or substantially the same shape, e.g., the same length and size, the same tooth shape and size, the number of teeth and/or the same pitch between the teeth in the first and second gear portions 14b and 14c.

In the configuration of the transmission member 14, the first gear portion 14 b is formed as a worm-wheel-shaped gear. In this case, the driving gear 13 coupled to the first gear portion 14b of the transmission member 14 is formed in the shape of a worm gear on the rotary shaft of the motor 12.

In the configuration of the transmission member 14, the second gear portion 14c is formed in the shape of a worm gear. In this case, the output gear 15 coupled to the second gear portion 14c of the transmission member 14 is formed as a worm-wheel-shaped gear.

In the actuator of the present invention, if the motor 12 is driven, the driving gear 13 is rotated, and the torque of the driving gear 13 is transmitted to the output gear 15 through the pair of transmission members 14 so that the output gear 15 is rotated. If the output gear 15 is rotated, the torque transmitted to the output gear 15 is finally output through the output shaft 16.

If the driving gear 13 is rotated in one direction, the two transmission members 14 are simultaneously rotated in the opposite directions, and the output gear 15 is rotated in the same direction as the driving gear 13.

In a case where the driving gear 13 is rotated in the reverse direction by the power of the motor 12, the two transmission members 14 are simultaneously rotated in the opposite directions, except that the rotational directions of the transmission member 14 and the output gear 15 are opposite to each other.

Figure 4:
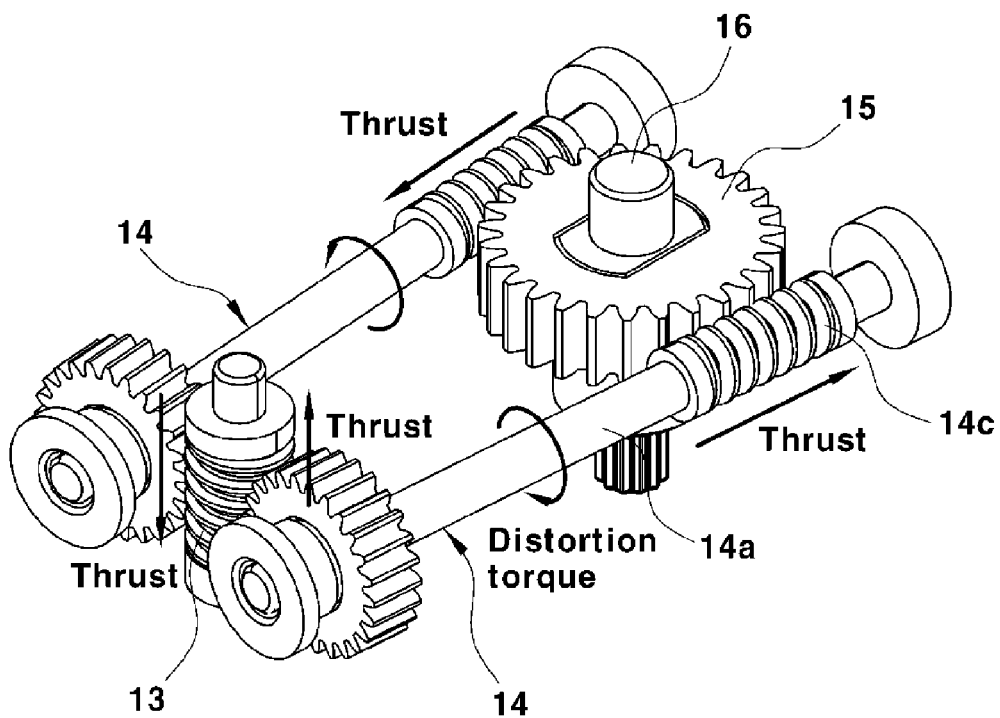
FIG. 4 is a view showing the distortion torque of an exemplary transmission member and the application direction of thrust according to the present invention.

FIG. 4 is a view showing the distortion torque of the transmission member and the application direction of thrust according to various embodiments of the present invention. As shown in FIG. 4, the directions in which the distortion torque is applied to the two transmission members 14 are opposite to each other.

In addition, the directions in which the thrust is applied to the two transmission members 14 are also opposite to each other, and the application directions of the distortion torque and the thrust to the two transmission members 14 are opposite to each other, regardless of the rotational direction of the driving gear 13.

As the two transmission members 14 are simultaneously rotated when the driving gear 13 is rotated by the power of the motor 12, the primary reduction of speed is made when the torque is transmitted to the two worm-wheel-shaped first gear portions 14b from the worm-gear-shaped driving gear 13, and the second reduction of speed is made when the torque is transmitted to the worm-wheel-shaped output gear 15 from the two worm-gear-shaped second gear portions 14c.

As a result, if a driver operates the parking brake system, the driving gear 13 is rotated as the power of the motor 12 is applied, and the output shaft 16 is rotated as the reduced torque is transmitted to the output gear 15 through the transmission members 14 by the rotation of the driving gear 13. Accordingly, the parking brake system is operated by the power output and transmitted through the output shaft 16, so that the movement of the vehicle is restricted.

The configuration of the actuator has been described as described above. Hereinafter, the advantages of the present invention will be described by comparing the present invention with a comparative example shown in FIG. 5.

Figure 5:
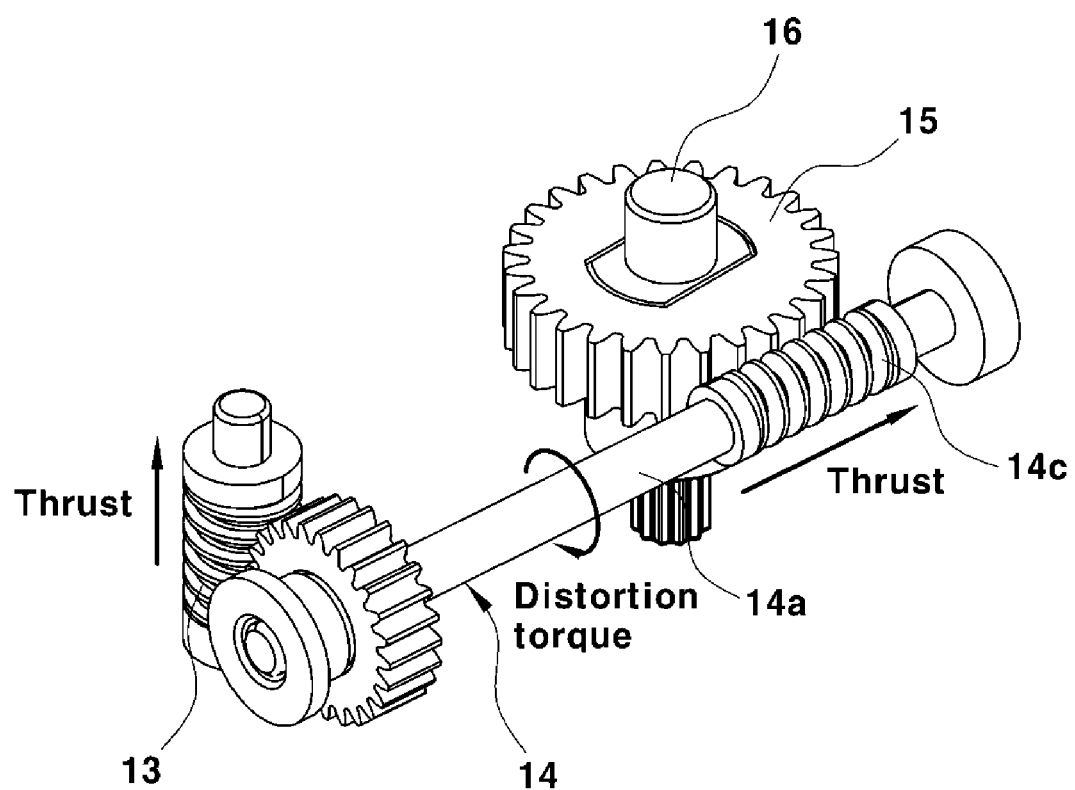
FIG. 5 is a view showing the configuration of a comparative example.

First, the comparative example shown in FIG. 5 uses only one transmission member 14. In the configuration using the single transmission member 14, a large backlash is generated due to a clearance between gears, and distortion torque applied to the transmission member 14 as a shaft element is relatively large in the application of a load.

In contrast, in the actuator of the present invention, double worms (two combinations of 'worm gear+worm wheel' are provided to respect to each transmission member) are disposed at both the left and right sides about the driving gear 13 and the output gear 15 as shown in FIG. 4, so that the backlash can be reduced by a plurality of gear engagements (phase differences) at both the left and right sides. In addition, the thrusts opposite to each other are respectively applied to the two transmission members 14, and thus the distortion torque applied to the transmission member 14 is relatively small as the reduction in thrust is made.

Accordingly, the actuator of the present invention has an advantage in that the torque transmission efficiency is enhanced by reducing the backlash and the distortion torque, as compared with the actuator of the comparative example. The actuator of the present invention also has an advantage that the operation noise is reduced by the stabilization of a gear shaft system. In the actuator of the present invention, stress can be distributed in the application of a load, as compared with the comparative example using the one transmission member 14. Thus, it is possible to increase the abrasion resistance and lifespan of the actuator and to reduce a gear frictional sound (noise) caused by the distribution of stress.

For convenience in explanation and accurate definition in the appended claims, the terms "inside" or "outside", left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuator for an electrical parking brake system, the actuator comprising:
   a case;
   a motor installed in the case to provide power;
   a driving gear provided to a rotary shaft of the motor;
   a pair of transmission members installed inside the case and engaged to the driving gear to reduce torque of the driving gear and transmit the reduced torque; and
   an output gear provided to an output shaft and engaged to the pair of transmission members to additionally reduce the reduced torque transmitted through the transmission members and output the additionally reduced torque through the output shaft,
   wherein each of the transmission members is formed in a shaft shape to connect the driving gear and the output gear, and is respectively disposed at lateral sides about the driving gear and the output gear,
   wherein the each of the transmission members includes:
     a shaft-shaped main body rotatably installed inside the case;
     a first gear portion provided at a first side of the main body and engaged with the driving gear; and
     a second gear portion provided at a second side of the main body and engaged with the output gear,
   wherein the driving gear is formed in a shape of a worm gear, and the first gear portion is formed as a worm-wheel-shaped gear,
   wherein the second gear portion is formed in a shape of a worm gear, and the output gear is formed as a worm-wheel-shaped gear.

2. The actuator of claim 1, wherein the pair of transmission members have substantially the same shapes and sizes, and are disposed substantially symmetrically to each other with respect to the driving gear and the output gear.

* * * * *